US009488974B2

(12) United States Patent
Song et al.

(10) Patent No.: US 9,488,974 B2
(45) Date of Patent: Nov. 8, 2016

(54) METHOD AND APPARATUS FOR PULSE-MODULATED FEEDBACK CONTROL

(75) Inventors: Yun Seong Song, Cambridge, MA (US); Neville John Hogan, Sudbury, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 1117 days.

(21) Appl. No.: 12/857,827

(22) Filed: Aug. 17, 2010

(65) Prior Publication Data
US 2012/0046793 A1 Feb. 23, 2012

(51) Int. Cl.
G05B 13/02 (2006.01)
G05B 19/414 (2006.01)

(52) U.S. Cl.
CPC . *G05B 19/4142* (2013.01); *G05B 2219/34217* (2013.01); *G05B 2219/41158* (2013.01)

(58) Field of Classification Search
CPC ............... G05B 19/4142; G05B 2219/41158; G05B 2219/34217
USPC ...................................................... 700/32–37
See application file for complete search history.

(56) References Cited

U.S. PATENT DOCUMENTS

| 3,105,928 | A | * | 10/1963 | Congleton | ........... G05D 3/1445 236/DIG. 8 |
| 4,791,588 | A | * | 12/1988 | Onda | ................... G05B 19/423 700/260 |
| 4,878,002 | A | * | 10/1989 | Heatzig et al. | ............ 318/568.2 |
| 5,838,561 | A | * | 11/1998 | Owen | .................. G05B 23/024 700/32 |
| 6,285,913 | B1 | | 9/2001 | Hagglund | |
| 7,856,281 | B2 | * | 12/2010 | Thiele | .................. G05B 13/048 700/28 |
| 7,962,101 | B2 | * | 6/2011 | Vaswani et al. | ........... 455/67.11 |
| 2001/0044662 | A1 | * | 11/2001 | Nakane | .............. G05B 13/0265 700/28 |
| 2005/0267606 | A1 | * | 12/2005 | Bartlett et al. | ................... 700/29 |
| 2006/0071965 | A1 | * | 4/2006 | Igarashi | ................... B41J 2/175 347/19 |
| 2007/0067678 | A1 | * | 3/2007 | Hosek | ............... G05B 23/0235 714/25 |
| 2007/0295699 | A1 | * | 12/2007 | Ulrich | .................... B23K 9/202 219/98 |
| 2008/0027925 | A1 | * | 1/2008 | Li | ..................... G06F 17/30864 |
| 2011/0125450 | A1 | * | 5/2011 | Lindenstruth | ....... G01M 13/027 702/113 |

OTHER PUBLICATIONS

Armstrong-Helouvry, et al.; "A Survey of Models, Analysis Tools and Compensation Methods for the Control of Machines with Friction;" Automatica; vol. 30, No. 7; Jul. 1994; pp. 1083-1138.
(Continued)

*Primary Examiner* — Kimberly Wilson
(74) *Attorney, Agent, or Firm* — Daly, Crowley, Mofford & Durkee, LLP (57) ABSTRACT

A control system and method for controlling a plant based on feedback is described. In some embodiments, the control system uses pulse-modulated (PM) control to overcome friction stickiness.

8 Claims, 8 Drawing Sheets

(56) References Cited

OTHER PUBLICATIONS

Bona, et al.; "Friction Compensation in Robotics: an Overview;" Decision and Control, 2005 and 2005 European Control Conference; CDC-ECC '05, 44$^{th}$ IEEE Conference; Dec. 12-15, 2005; pp. 4360-4367.

DeWeerth, et al.; "A Simple Neuron Servo;" IEEE Transactions on Neural Networks; vol. 2, No. 2; Mar. 1991; pp. 248-251.

Hojjat, et al.; "Application of Electromagnetic Impulsive Force to Precise Positioning;" Int. J. Japan Soc. Prec. Eng., vol. 25, No. 1, Mar. 1991, pp. 39-44.

Huang, et al.; "Experiments in Impulsive Manipulation;" IEEE International Conference on Robotics & Automation; May 1998, pp. 1077-1082.

Kermani, et al.; "Friction Compensation in Low and High-Reversal-Velocity Manipulators;" IEEE International Conference on Robotics & Automation; Apr. 2004, pp. 4320-4325.

Nelson; "Pulse-Width Relay Control in Sampling Systems;" Journal of Basic Engineering; Mar. 1961; pp. 65-76.

Popovic, et al.; "Novel Controller Using Fuzzy Logic Interpolation for Accurate Positioning under Conditions of Nonlinear Low-velocity Friction;" Conference on Decision & Control, IEEE; Dec. 1995; pp. 267-272.

Rathbun, et al.; "Pulse Width Control for Precise Positioning of Structurally Flexible Systems Subject to Stiction and Coulomb Friction;" Journal of Dynamic Systems, Measurement and Control; vol. 126; Mar. 2004; pp. 131-138.

Rathbun; "Pulse Modulation Control for Flexible Systems Under the Influence of Nonlinear Friction;" University of Washington; 2001; 216 pages.

Seong Song, et al.; "Pulse-Modulated Feedback Control to Overcome High Non-Linearities;" Patent and Literature Survey for MIT Case 14017; 5 pages.

Suzuki, et al.; "Design and Implementation of Digital Servo Controller for High Speed Machine Tools;" IEEE Explore; Jan. 25, 2010; pp. 1246-1251.

Yang, et al.; "Adaptive Pulse Width Control for Precise Positioning Under the Influence of Stiction and Coulomb Friction;" Journal of Dynamic Systems, Measurement and Control; vol. 110; Sep. 1998; pp. 221-227.

* cited by examiner

METHOD AND APPARATUS FOR PULSE-MODULATED FEEDBACK CONTROL

CROSS REFERENCE TO RELATED APPLICATIONS

Not Applicable.

STATEMENT REGARDING FEDERALLY SPONSORED RESEARCH

Not Applicable.

FIELD OF THE INVENTION

The concepts described herein relate to feedback control, and more particularly to a method and apparatus for pulse-modulated feedback control to overcome hard non-linearities.

BACKGROUND OF THE INVENTION

As is known in the art, feedback control is one important element of modern machine design. While it is effective in most cases, physical phenomena such as static friction complicate conventional feedback control strategies such as proportional-integral-derivative (PID) control. Friction exhibits a highly-variable "hard" (discontinuous) non-linearity which challenges even advanced feedback control strategies. Other non-linearities include, but are not limited to hysteresis curves, backlash, sudden changes in an environment, non-repeatability or uncertainty in the parameter values.

Friction is everywhere. Friction and stiction exist between any two objects sliding on each other. Friction is found between valves in hydraulic pipes, between bearings and shafts, in any mechanical transmission system or in any actuator. To control motion with physical actuators, the effect of friction must be considered. In heavy industrial manipulators, friction can cause large errors in position, in some cases errors up to 50% or more in position. In precise robotic motion control, poor friction compensation leads to tracking errors. Friction compensation is thus a crucial step in designing a controller for any active system with physical actuators.

Various techniques have been proposed to compensate for friction. Generally, the approach is to establish a mathematical model of the system friction through identification procedures and then, based on this model, add a friction compensation term in the main control loop. Often, better estimation of friction can be achieved using a dynamic friction model, which is updated by a state observer in the control loop. If a model of friction is not available or cannot be identified, classical PID control with properly pre-tuned parameters may be used.

U.S. Pat. No. 6,285,913B1 describes a control system which generates a pulse train which is not dependent upon position error (open loop). The amplitude and frequency of the pulses is fixed and the amplitude of the pulse is 1-10% of the controlling range of the control signal (intentionally kept low). The pulse train is superimposed on top of a control signal going into an actuator.

One prior art reference entitled "A Simple Neuron Servo," IEEE Transactions on Neural Networks, Vol. 2 No. 2 Mar. 1991 by Stephen P. Deweerth, et al. (hereinafter "Deweerth 1991") describes modulation of velocity. This is achieved by a complex neural network controller whose output is a sequence of pulses. Thus, the implementation of the Deweerth system is relatively complex.

Another prior art reference entitled "Application of Electromagnetic Impulsive Force to Precise Positioning," The Bulletin of the Japan Society of Precision Engineering, Volume 25, pp. 39-55, 1991 by Higuchi Hojjat, et al (hereinafter "Hojjat 1991") focuses on the development of apparatus for supplying an accurate magnitude of impulse for precise positioning. The system described in this reference utilizes a main controller having an undesirable level of complexity and furthermore, the system can only modulate position.

Another prior art reference entitled "Pulse Modulation Control for Flexible Systems Under the Influence of Nonlinear Friction," a dissertation submitted in partial fulfillment of the requirements for the degree of Doctor of Philosophy at the University of Washington, 2001 (hereinafter "Rathbun 2001") describes a control scheme having an undesirable level of complexity.

It should be appreciated that the prior art techniques perform reasonably well only if some knowledge of the friction is provided. For this reason, some techniques work only for some specific problems. Hence, none of the prior art techniques are simple, robust or versatile enough to serve as a general method for friction compensation. Worse yet, if the friction is highly non-linear and/or non-repeatable none of these techniques will work consistently.

It would, therefore, be desirable to provide a method and apparatus for a simpler and more robust feedback control which copes with the non-linearities.

SUMMARY OF THE INVENTION

The present invention is inspired by the simplicity and robustness of conventional "on-off control" which modulates an outcome by turning a plant on or off. A typical home heating system is of this type. Conventional on-off controllers, however, are successfully applied to systems with long time-constants and, more important, without discontinuous ("hard") nonlinearities such as static friction. The present invention takes advantage of the ultra high speed and precision of modern digital processing to overcome this limitation and provide a method and apparatus for a simple, robust feedback control which copes with non-linearities.

In accordance with the present concepts, systems and techniques described herein, a control system includes an actuator, a pulse modulated (PM) controller coupled to the actuator for turning the actuator on or off in response to an input provided thereto.

With this particular arrangement, a PM control system which uses high-frequency on-off switching of a system (or plant) to achieve fine control of position and velocity under uncertainties such as the static friction is provided. It should, of course, be appreciated that any other external disturbances that are not considered in the model could be viewed as uncertainties. Examples include, but are not limited to, a noisy environment, modeling error (friction, misalignment in the shafts, fabrication error . . . ), gear train, or external intervention.

By using high-frequency on-off switching of the system, the control system is able to overcome hard non-linearities. The PM control system and techniques described herein work on rotary motors, valves as well as with actuators, including, but not limited to linear motors, engines and pumps.

In accordance with the concepts, systems and techniques described herein, the decision of whether to supply a pulse (and to which direction) depends upon the current position error (closed loop) while a frequency of the pulse is neither defined nor needed. Furthermore, the pulse amplitude can be as high as the maximum controller output (intentionally kept high) and the sequence of pulse itself goes into the actuator.

A control system provided in accordance with the concepts described herein has the following advantages: (a) it does not require a rigorous model; (b) it is simple (e.g. is not a supplementary controller attached to a larger, more complex control scheme); (c) the system can modulate velocity (i.e. the system does not have to come to rest for the next impulse to hit); and (d) the system is energy efficient (since the motors are said to be the most energy efficient when they are at full speed or fully off, it is believed that the system is energy efficient since the PM controller essentially jumps between these efficient states and avoids the mid-speed region where the actuator could be less efficient).

It should be appreciated that this control scheme does not require a rigorous model, because having an accurate model or not does not affect the performance of the PM controller. In other controllers such as PID, one needs to know the system characteristics to the extent that a math model can be formulated of sufficient accuracy to enable proper selection of gains, otherwise the PID controller may not function properly. In some cases the PID controller will not work regardless of the model, especially if there is a discontinuity in the model near the operating condition such that very high gains are required. Also, almost all other cases of friction compensation controllers require some knowledge of the friction itself in order for the scheme to work properly. In the PM controller described herein, a model of the friction is unnecessary. It is believed that the PM control scheme described herein does not require a model because the controller essentially does only two things: i.e. turns on or turns off. Thus, the system response to anything in between is unimportant. Or more simply put, it is because the controller is very simple. As long as the system shows non-zero response to the 'on' command and no response to the 'off' command, the PM control will work.

It is important to note that the PM control scheme described herein successfully modulates a given time history of position (velocity), whereas prior art techniques primarily only deal with a single target position to be acquired. In the PM control scheme described herein, velocity can be modulated by providing a target position which changes with time. The controller does not require information on the current velocity. The controller merely requires information which describes whether the current position is where it should be or not. This simple decision making is enough to let the system follow the position trajectory.

The PM control scheme described herein can be used to overcome static friction and is used with high frequency switching between on and off states. High speed switching is responsible for the position tracking (velocity modulation). Overcoming friction can be credited to the fully on-fully off nature of the controller and related techniques described herein. As long as the actuator is strong enough, its full-on state is able to overcome the static friction.

Furthermore, PM control techniques described herein are the first attempt known to use high-frequency on-off switching of the plant to achieve fine control of position and velocity under uncertainties such as static friction.

The PM control scheme utilizes a simple feedback control strategy (i.e. a pulse-modulated control) which effectively makes the non-linearities 'disappear' from the physical plant. Thus, the method and apparatus for feedback control described herein copes with non-linearities.

The PM control technique described herein is relatively simple to implement compared with prior art approaches, yet the PM control technique described herein can overcome the highly non-linear, non-repeatable form of friction that no tractable math model can successfully describe. One does not need any knowledge of friction, even if its behavior is highly non-repeatable. One does not need to design a complex main control loop in order to successfully compensate for the friction. PM control is by far the simplest, cheapest, and most versatile friction compensation technique developed to date. Its simple form and reliability enables PM control to be used in a variety of situations, such as controlling fine movement of micron-scale objects (at that scale stiction is the dominant force), achieving better 'feel' by eliminating the effect of friction in medical robots interacting with humans or animals, controlling the position of robotic manipulators or vehicles, or modulating the opening and closing of pressure valves in large-scale pipelines in the energy industry.

Since PM control modulates an actuator to be either fully-on or fully-off, its performance is indifferent to how the actuator behaves in moderate operating conditions. In addition, when the actuator with PM control is turned on, it spends as little time as possible in the high-force, no-velocity region where the input-output power efficiency is poor, and moves quickly to the low-force, high-velocity region where efficiency is highest. This means that PM control naturally drives the actuator in the most efficient way. This binary nature of PM control is analogous to how modern digital circuits work; for example, complementary metal-oxide semiconductor (CMOS) circuits operate at full-on or full-off states for maximum efficiency and robust noise rejection. The basic idea of the most successful electronic circuit design—digital switching between 0 or 1—can be used in physical systems with PM control, and achieve maximum efficiency, simplicity and robustness in compensating for friction.

The PM control strategy described herein effectively overcomes hard non-linearities in a system which cannot be remedied by other conventional feedback control strategies. It is shown that the techniques described herein work well on a system with highly variable non-linearity, in contrast to unacceptable performance of proportional (P) control, for example. The strategy is simple enough to be described in a few lines of computer code, and promises to find successful application in many other systems with similarly challenging non-linearities.

BRIEF DESCRIPTION OF THE DRAWINGS

The foregoing features of this invention, as well as the invention itself, may be more fully understood from the following description of the drawings in which.

DETAILED DESCRIPTION OF THE PREFERRED EMBODIMENTS

Before describing a pulse modulated (PM) controller and techniques for implementing a PM control strategy, it should be appreciated that, in an effort to promote clarity, reference is sometimes made herein to the PM control strategy as applied to a rotary electric motor having a gear train which exhibits non-linear static friction. Thus, in this specific example, a PM controller and PM control strategy is described in the context of a system having non-linear static friction. Such reference should not, however, be taken as limiting the PM controller and PM control strategy to use with systems having non-linear static friction. Rather, as mentioned above, the PM controller and PM control strategy described herein find application in a wide variety of different systems including but not limited to rotary motors, valves and actuators, including, but not limited to linear motors, engines and pumps.

Accordingly, those of ordinary skill in the art will appreciate that the description provided herein of processing taking place to address issues caused by non-linear static friction could equally be taking place to overcome other non-linearities in a wide variety of different types of systems.

Figure 1:
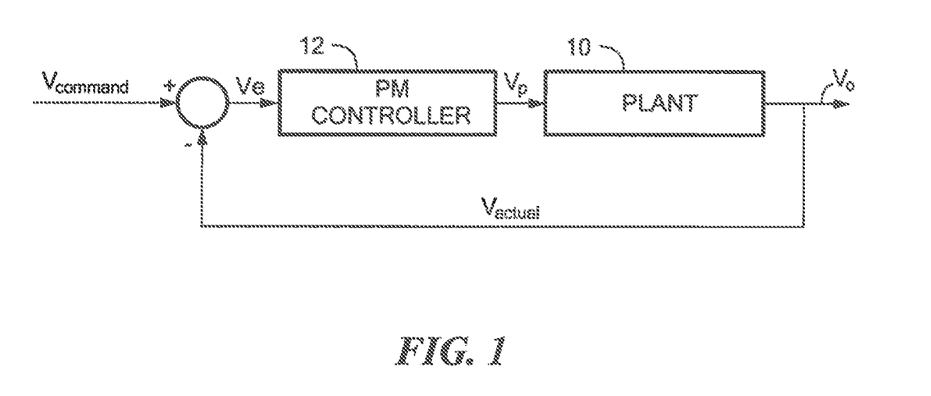
FIG. 1 is a block diagram of a system which uses a pulse modulated (PM) control strategy.

Referring now to FIG. 1, a plant or system 10 receives an input $V_p$, from a pulse modulated (PM) controller 12 and produces an output signal $V_o$. A sensor (not shown in FIG. 1) couples a signal designated $V_{actual}$ to an input of PM controller 12. It should be appreciated that in some systems, $V_o$ is identical to $V_{actual}$. PM controller 12 receives a command signal $V_{command}$ as well as feedback signal $V_{actual}$ and performs a decision making operation (to be described below in conjunction with FIG. 1A) using the two signals $V_{command}$ and $V_{actual}$. Briefly, PM controller 12 operates such that it effectively overcomes the hard non-linearities associated with the system which cannot be remedied by conventional feedback control strategies. Thus, the PM controller and technique described herein works well on systems with highly variable non-linearity, in contrast to unacceptable performance of P control.

The PM controller strategy will be described in detail below in conjunction with FIGS. 1A-4. Suffice it here to say, however, that the PM controller utilizes a strategy which is simple enough to be described in a few lines of computer code, and can be applied to many different types of systems with similarly challenging non-linearities.

Figure 1A:
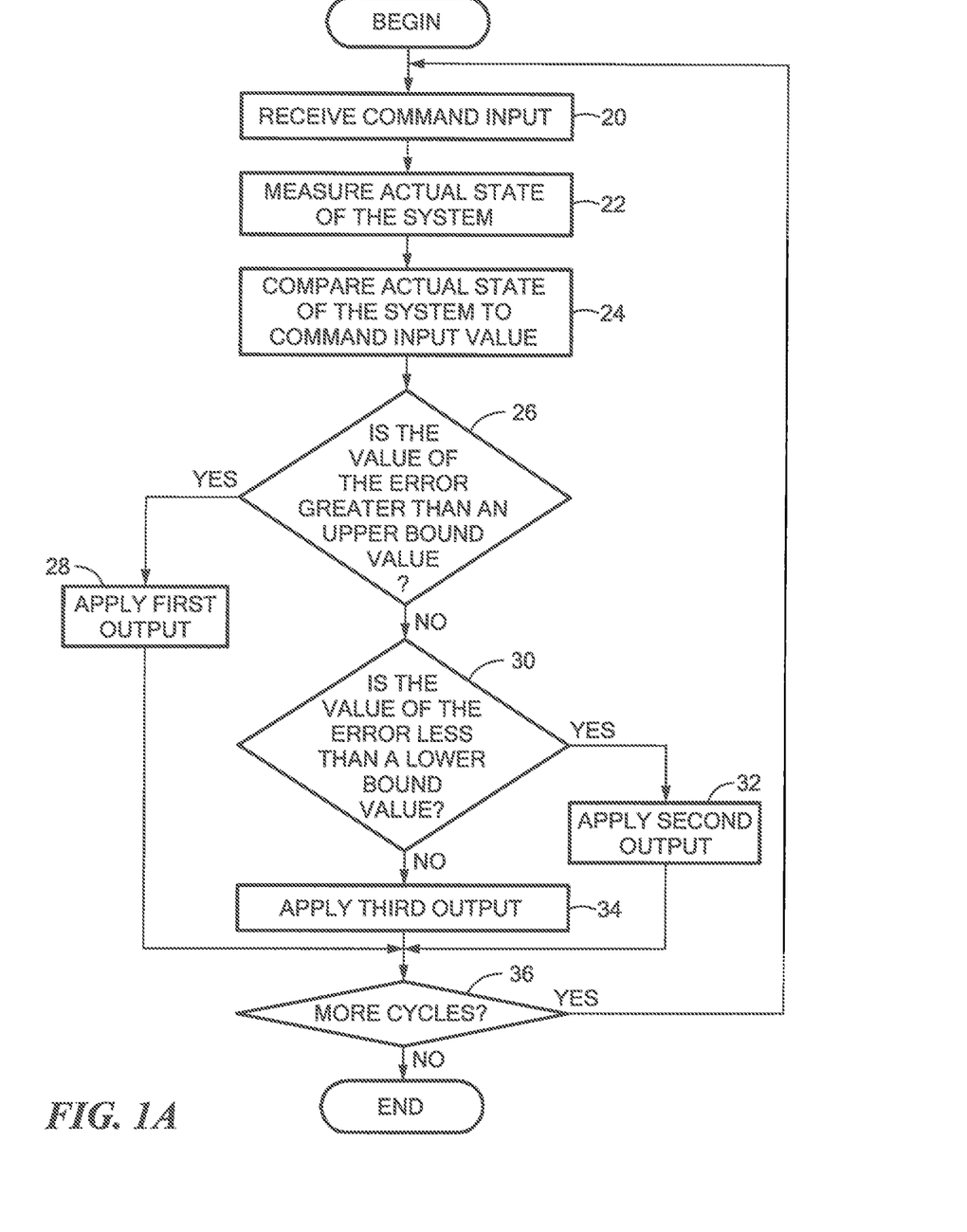
FIG. 1A is a flow diagram of a PM control strategy.

Referring now to FIG. 1A, as shown in processing blocks 20-24 a PM controller receives a command input signal (e.g. $V_{command}$ shown in FIG. 1) and a value representative of an actual state of a system (e.g. $V_{actual}$ shown in FIG. 1) and compares the two values. Block 24 calculates an error value, $V_e$, between the command input signal and the actual state of the system. That is, $$V_e = V_{command} - V_{actual}$$

In response to the comparison, the PM controller determines whether the error value $V_e$ is greater that an upper bound value, $V_{upper}$. This upper bound value is pre-determined and provided by the user.

If a decision is made in block 26 that the error between the command input and the actual state is greater that an upper bound value, then processing proceeds to block 28 where controller provides a control signal having a first value. That is, IF ($V_e > V_{upper}$)
THEN apply first value
ELSE proceed to block 30

If in decision block 26, a decision is made that the value of the error is less than an upper bound value, then processing proceeds to decision block 30 where PM controller determines whether the value of the error $V_e$ is less than a lower bound value, $V_{lower}$. The lower bound value is pre-determined and provided by the user.

If a decision is made that the value of the error is less than the lower bound value, then processing proceeds to block 32 where PM controller provides a control signal having a second value which is different that the first value. That is, IF ($V_e < V_{lower}$)
THEN apply second value
ELSE proceed to block 34

If a decision is made in decision block 30 that the value of the error is not less than the lower bound value ($V_{lower}$), then processing proceeds to block 34 where the PM controller provides a control signal having a third value which is different than the first and second values.

As shown in decision block 36, if there are more cycles, then processing loops back to processing block 20. Otherwise, processing ends.

Thus, in practical systems in which the process of FIG. 1A is repeated for multiple cycles, the process ends up producing a sequence of control signals which are analogous to (or resemble) a pulse-train. That is, the sequence of control signals (i.e. the first, second or third control signals) produced by a PM controller (e.g. via a repetitive sequence of processing blocks 20-34 in FIG. 1A) resembles a pulse-train.

In order for the PM control to be successful, the magnitude of the first and second values should be large enough to drive the system past the region affected heavily by the non-linearities. The third value is usually, but not limited to, zero. It should be appreciated that in most systems, the third value is zero (or more precisely substantially zero) however, the third value need not be zero (or substantially zero). That is, in some applications, it may be desirable to make the third value some non-zero value (e.g. a value smaller than the first and second values, but not zero).

Figure 1B:
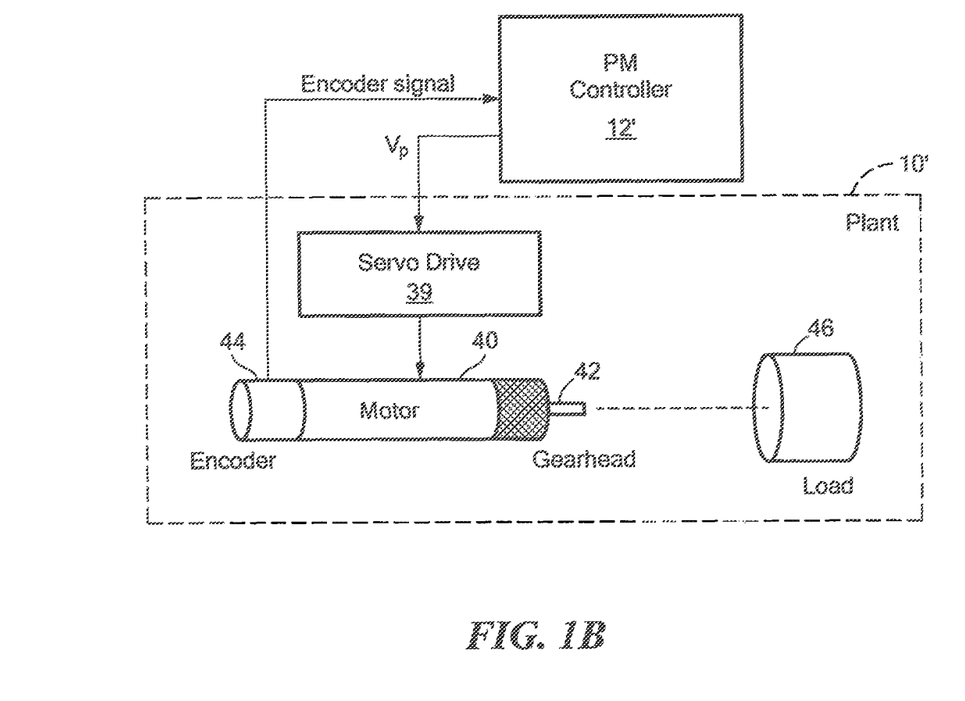
FIG. 1B is a schematic of an exemplary implementation.

Referring now to FIG. 1B, system or plant 10' may, for example, correspond to a rotary electric motor 40 coupled to a load 46 through a gearhead 42. Motor 40 is coupled to a PM controller 12' through a servo drive 39. PM controller 12' may be the same as, or similar to PM controller 12 described above in conjunction with FIGS. 1 and 1A. An encoder 44 is coupled to motor 40 to measure the position of the motor shaft and provides signals to PM controller 12'.

As is known, rotary electric motors are a widely used type of actuator. Because they operate well at high speed (e.g. tens of thousand of revolutions per minute or RPMs) it is common to place a gear train on the motor output shaft to reduce speed and increase torque output. The gear train typically includes several stages of gears, and each stage exhibits non-linear static friction that depends in general on the configuration and loading of the other stages. A typical configuration is the Maxon EC6 motor with gearhead

304180. The static friction exhibited by this configuration is highly variable, as will be discussed below in conjunction with FIG. 2.

As described above in conjunction with FIG. 1A, and in accordance with the concepts, systems and techniques described herein, pulse-modulated (PM) control assumes (like any feedback controller) that a sensor is available to monitor whether the system is following a commanded input. Using a voltage-controlled motor 40 as an example, let $V_{in}$ be the command input, $V_a$ be the voltage that represents the actual state of the system (measured through the appropriate sensor). Also let $\Delta V$ be the 'margin' of error, and $V_p$ be a constant magnitude of pulse in volts. Then, the PM control is defined by:

```
for (each cycle)
    take V_in
    measure V_a
    if ( V_in - V_a > ΔV) then apply voltage V_p
    else if (V_in - V_a < -ΔV-) then apply voltage-V_p
    else apply voltage = zero
    repeat
```

The effort with which the system is being pushed or pulled by the actuator is given by $V_p$, chosen in this example to be the maximum driving voltage that can be delivered to the actuator. In words, the PM controller uses the actuator to push the system forward as hard as possible if it is behind the commanded input by more than $\Delta V$, and to pull the system backward as hard as possible if it is ahead of the commanded input by more than $\Delta V$. When the system is close enough to the command (i.e. the error is less than $\Delta V$), then the actuator does nothing. Hence the actuator is either fully "on" (in either direction) or completely "off". In this regard, PM control resembles modern digital electronics but applied to mechanical hardware. It should be noted however that in other applications, $V_p$ may not have to be the maximum driving voltage.

It should, of course, be appreciated that one possible variation of PM control is to use less-than-maximum driving voltage to the actuator. As long as the driving voltage is big enough to overcome the friction (or other non-linearities), the PM control system and technique described herein will work. One possible advantage of having less-than-maximum voltage is that it may allow even finer modulation of position or velocity, by compromising the maximum velocity output (FIG. 1A already includes this possible variation).

It should also be appreciated that in the above example of controlling a system having non-linear static friction (i.e. static friction which is highly variable), the value of the first control signal corresponds to voltage $V_p$, the value of the second control signal corresponds to voltage $-V_p$, and the value of the third control signal corresponds to zero. It should also be appreciated that in the non-linear static friction case, the value of the third control signal must have a value of zero or close to zero in order to ensure proper operation of the control scheme. Thus, the value of the third control signal must be small compared to and distinctly different from the values of the first and second control signals such that the value of the third control signal is smaller than a value which would evoke a nonlinearity in the system being controlled.

Figure 2:
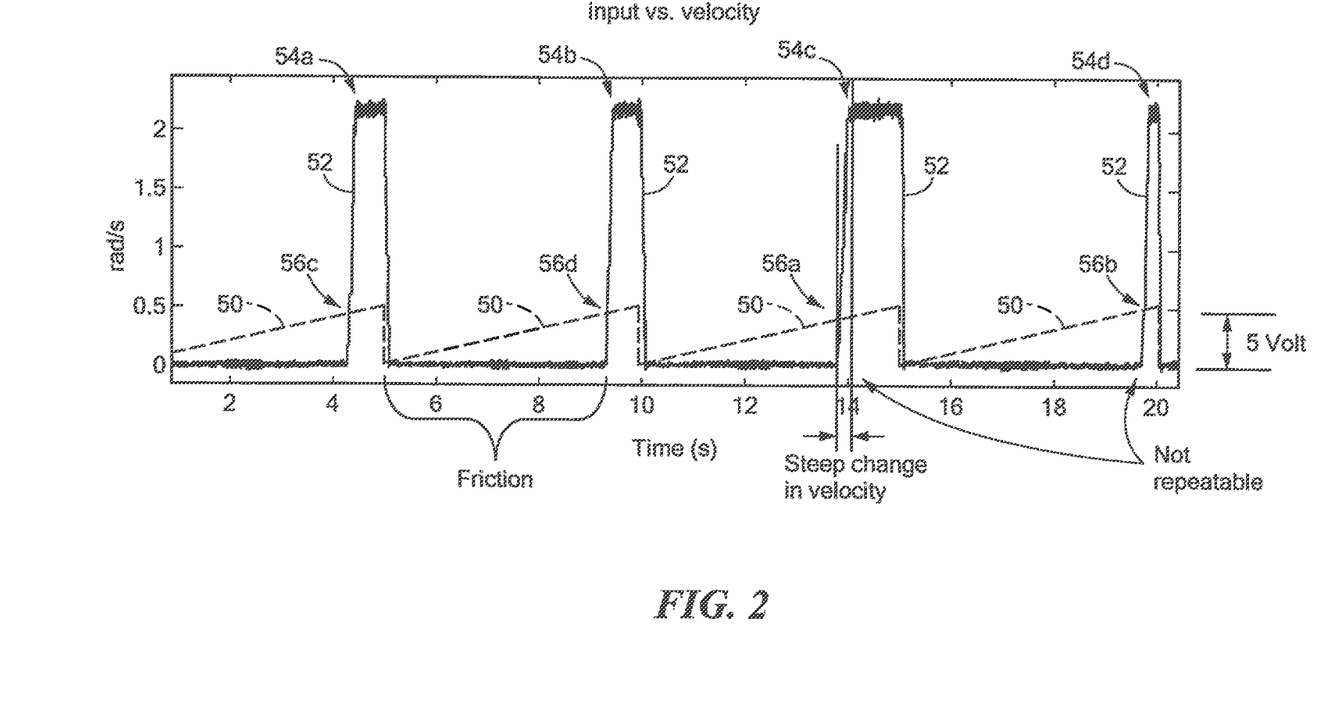
FIG. 2 is a plot of velocity (rads/sec) vs. time of a motor and gearhead system in response to a command voltage into the motor amplifier.

Referring now to FIG. 2, a plot of command voltage vs. velocity which illustrates highly variable, non-linear behavior of a motor and gearhead system (e.g. motor 40 and gearhead system 42 in FIG. 1B) is shown. The plot includes a first curve 50 which represents a command voltage into a motor amplifier and a second curve 52 which represents a velocity output of the motor collected from the encoder (e.g. from an such as encoder 44 in FIG. 1B). The motor does not turn when the supplied voltage is smaller than approximately 3~4 Volts. The motor speed is abruptly increased for the next 0.1~0.2 volts, and then saturates at the peak velocity after approximately 4~4.5 volts. The motor response is highly non-linear.

The motor response is highly non-repeatable as well. It should be noted in FIG. 2 that reference numerals 54a-54d designate four steep changes in the velocity (rads/sec) from zero to full. It should be appreciated that these sharp transitions happen at different input voltages as represented by command voltage 50. For example, the transition 56a at around 14 seconds happens when the input voltage as shown by command voltage curve 50 is around 3.5 volts (V). In the next run, the transition 56b happens at around 20 seconds, when the input voltage is now around 4.5 volts. The first two transitions 56c, 56d near 4 seconds and 9 seconds, respectively, happen when the input voltage is around 4 volts. Which leads to the conclusion that the amount of effort needed to overcome the static friction is different each time the test is run.

The response of the motor as seen in FIG. 2 can be summarized as follows.

$0<V_{in}<V_c$: no response,
$V_c<V_{in}<V_s$: motor speed increases,
$V_s<V_{in}$: motor is at its full speed, where $V_{in}$ is the input voltage represented by curve 50, $V_c$ is the critical voltage at which the motor starts turning, which is the value of $V_{in}$ at 56a-56d, and $V_s$ is the saturation voltage beyond which the motor is at its full speed. Note that $V_c<V_s$ but $V_s-V_c$ is very small. Also note that the values of $V_c$ and $V_s$ are highly variable. Thus, the system shows a highly non-linear behavior and, more important, it is highly unpredictable.

It is almost as if the system is at zero speed below $V_s$ (or $V_c$) and at its full speed above $V_s$ (or $V_c$), where $V_s$ is variable. It is thus difficult to control the motion of the motor shaft, since it is almost impossible to get the motor to turn at an intermediate speed. For this reason, conventional continuous feedback control cannot work.

Because of the high variability it is essentially impossible to describe the system behavior by a set of analytical equations. This means that it is not practical to construct an inverse model of the non-linearity with which to cancel out the effect mathematically, as is often done in other studies.

Figure 3A:
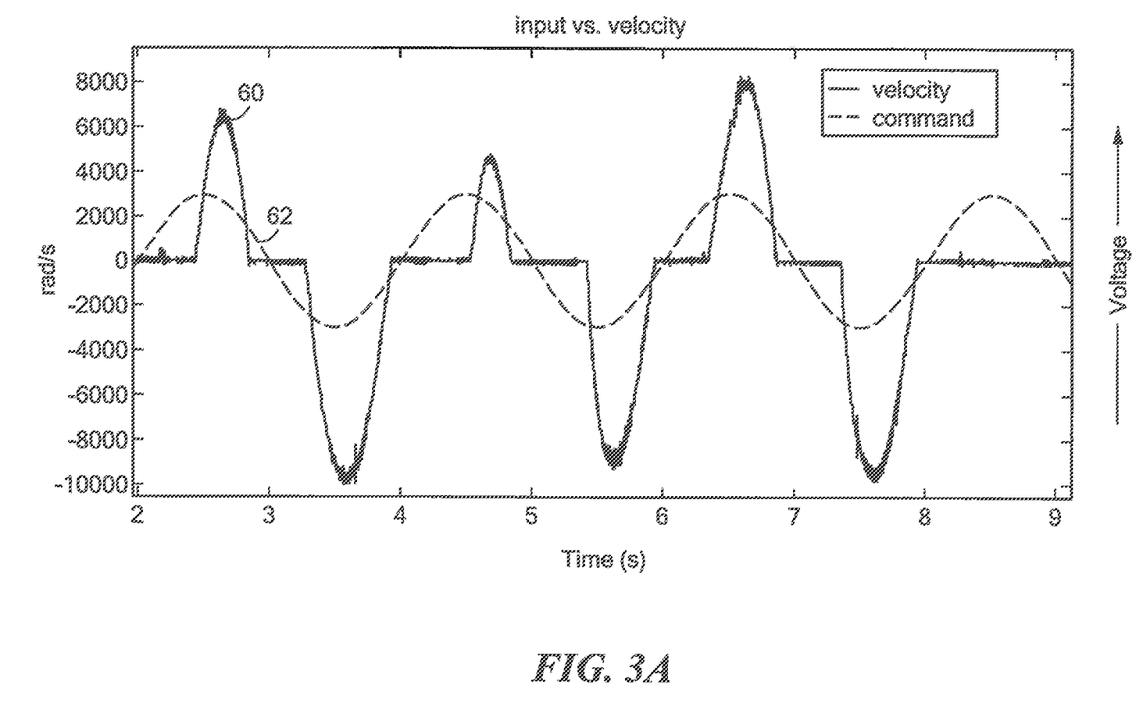
FIG. 3A is a plot of a velocity (rads/sec) vs. time of an open loop response of a motor and gearhead system in response to a command voltage into a motor amplifier before applying PM control.

FIG. 3A is a plot of motor shaft velocity (curve 60) and command voltage (curve 62) vs. time. It should be appreciated that motor shaft velocity is measured by an optical encoder and illustrated as curve 60. The plot shows the open-loop response of the system given a slow (0.5 Hz) sine command signal 62 (i.e. the system is open loop with no controller implemented). This is the raw response of the system given the sinusoidal command signal 62. As can be seen from FIG. 3A, the motor is at zero velocity (as evidenced by curve 60) when the magnitude of the command voltage 62 is low. The motor turns at a non-zero speed when the magnitude of the command voltage is high enough, but the voltage at which the motor starts turning varies over time and also depending on the direction of the command.

Figure 3B:
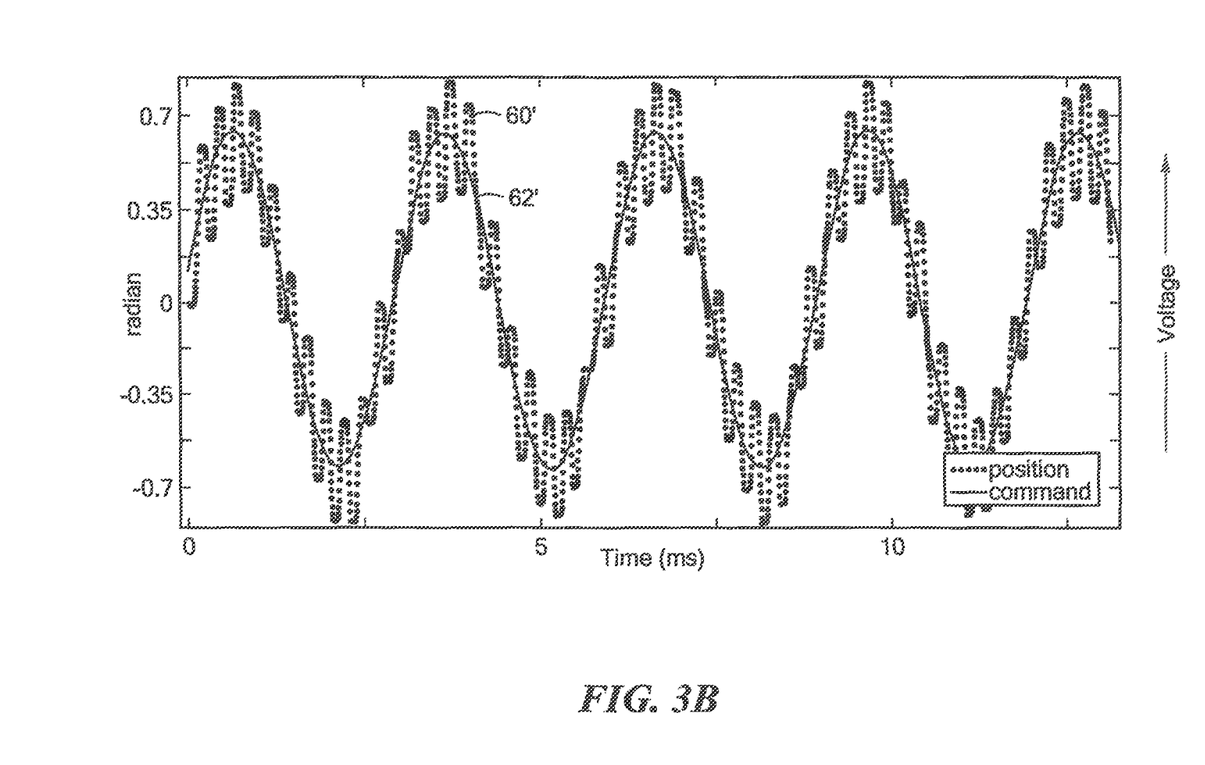
FIG. 3B is a plot of velocity (rads/sec) vs. time of an open loop response of a motor and gearhead system in response to a P-control strategy generated command voltage into a motor amplifier.

FIG. 3B illustrates an attempt to control the position of the motor of FIG. 3A using conventional proportional (P) control. As can be seen from FIG. 3B, motor response represented by curve 60' vigorously fluctuates around the command voltage represented by curve 62'. Since the motor can be either at its full speed or at zero velocity. Fine tuning of the motor velocity is not possible.

With respect to FIGS. 3 and 3A it should be noted that the system response is not symmetric in the positive and negative velocity regions. It should also be noted that a P-control attempt to control the position of the motor results in the actual position fluctuating vigorously around the command. It should also be noted that the response is either at full speed (steep change in position) or no speed (flat regions in position). As evidenced by the varying position of the motor (curve 60') in response to the command signal (curve 60') illustrated in FIG. 3B, it can be concluded that conventional control strategies do not work well in a system such as that described in conjunction with FIG. 1B.

Figure 4:
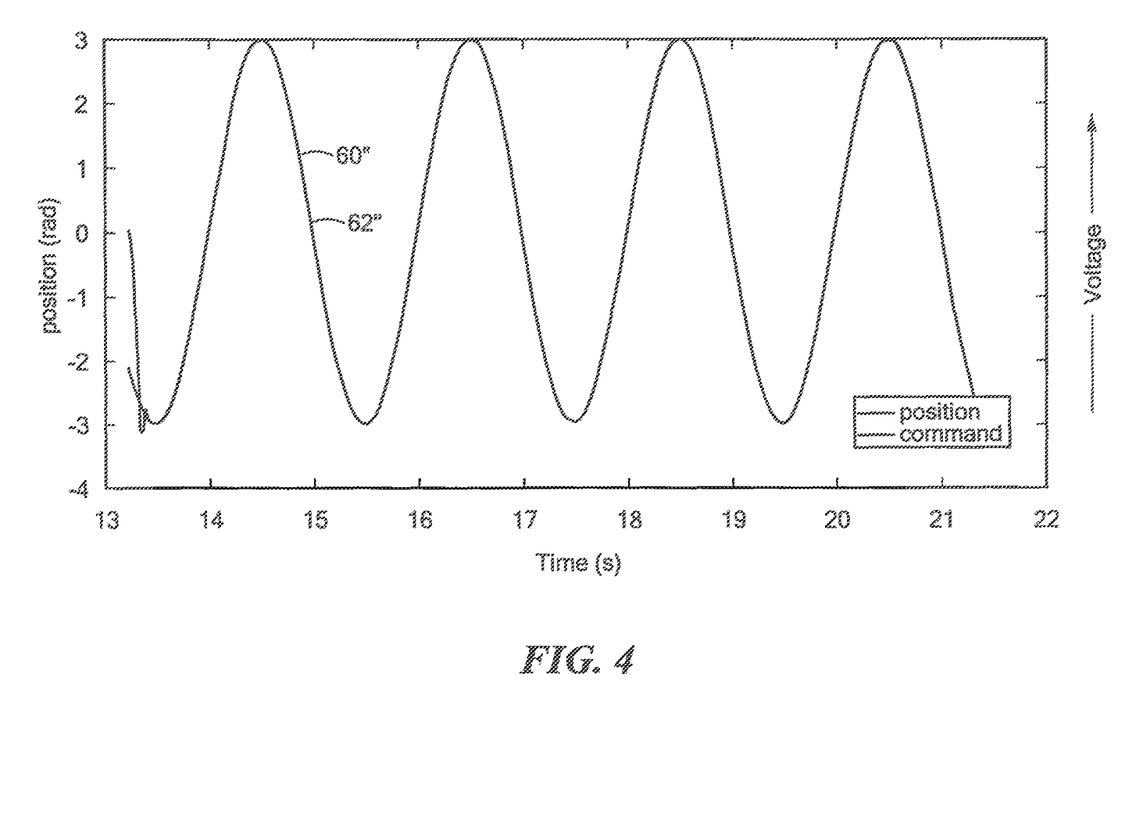
FIG. 4 is a plot of position (rads) vs. time (secs) of a PM control strategy generated command and a response.

Now if the PM control strategy described herein (e.g. in conjunction with FIGS. 1-2) is applied, one is able to drive the system to follow the command position as shown in FIG. 4.

Referring now to FIG. 4 a plot of the command and response using the PM control is shown. Curve 60" corresponds to a motor position curve while curve 62" corresponds to a command signal curve. As can be seen in FIG. 4, the two curves 60", 62" lie substantially on top of each other. In this example, Vp=4V and ΔV=2 degrees as read by the encoder, and sampling was done at a rate of 2 kHz.

Thus, PM control (as described above in conjunction with FIGS. 1-2) successfully follows the command position which conventional P control was unable to follow. The result is the virtual disappearance of the extreme non-linearity in the system, which could not be described by any simple analytical equation. Also, the motor is either fully on or fully off, making it operate at its highest efficiency. Moreover, as long as the motor is powerful enough, the PM control guarantees that the error between commanded and actual motion stays within a finite region. This property makes the system precisely predictable. Thus, the PM control system and technique described herein works with systems having variable values such as changing friction values.

There are at least six parameters involved in PM control. 1) sampling rate, 2) $V_{upper}$, 3) $V_{lower}$) 4) first value, 5) second value and 6) third value. In the example described in conjunction with FIGS. 2-4, only three values are used to form the six parameters. They are: 1) sampling rate, 2) amplitude of the pulse ($V_p$), and 3) margin of error (ΔV). That is, in the example as described by FIGS. 2-4, $V_{upper}$=ΔV
$V_{lower}$=−ΔV
First value=$V_p$
Second value=−$V_p$
Third value=zero In most cases the sampling rate is constant, so we are left with the two parameters—i.e. amplitude of the pulse $V_p$ and margin of error ΔV. The apparent system behavior may change depending on these values.

It should be appreciated that the PM control scheme described herein can be used with a wide variety of systems including, but not limited to: rotary electric motors or any system which includes at least one actuator.

Figure 5:
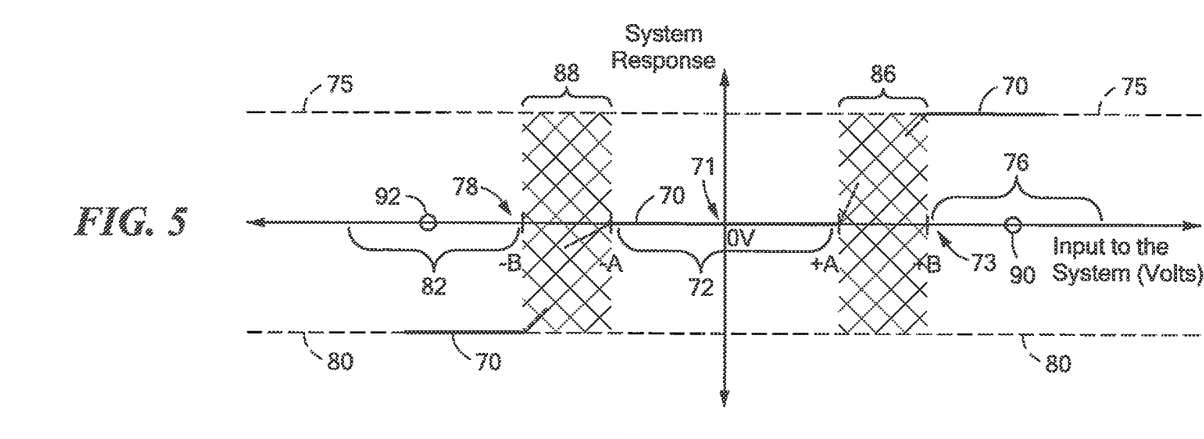
FIGS. 5 and 5A, are plots of system response vs. system input.
Figure 5A:
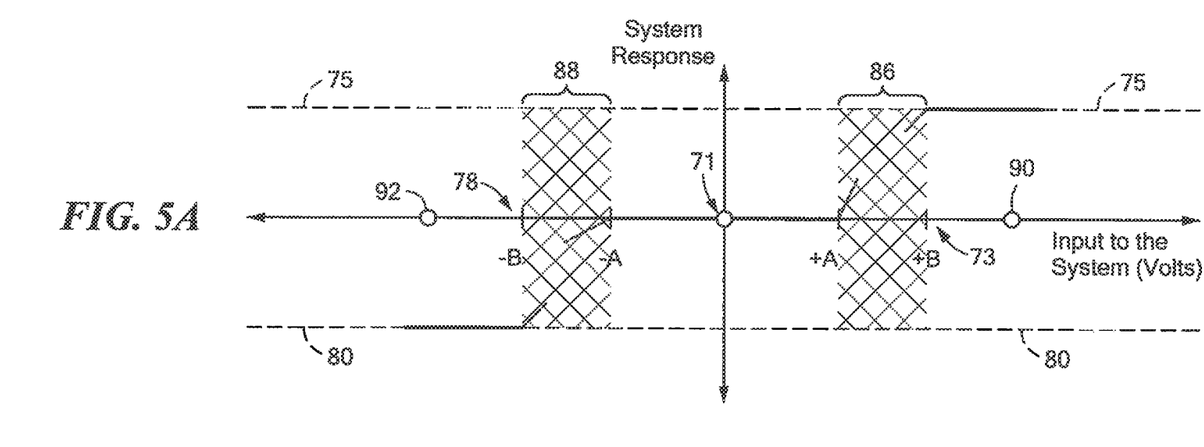

With respect to selection of the control values provided by a PM controller, reference is now made to FIGS. 5 and 5A, in which like elements are provided having like reference designations. FIGS. 5 and 5A are plots of system response vs. system input. In both FIGS. 5 and 5A, the horizontal axis represents a system input value and the vertical axis represents a system output characteristic.

The system input value may correspond to an output value provided from a controller. As will be described below in conjunction with FIG. 5A, the system input value may correspond to an output value from a PM controller such as a PM controller described above in conjunction with FIGS. 1-4.

In FIGS. 5 and 5A, it is assumed that the system has a response characteristic illustrated by a response curve represented as the line designated with reference numeral 70 in FIGS. 5 and 5A. One example of such a system would be a motor having an input which is a voltage and an output which is the velocity of a motor shaft.

To provide clarity in FIGS. 5 and 5A and ease of explanation of the concepts disclosed herein, it will be assumed in FIGS. 5 and 5A that the input to the system is a voltage (although it should be understood that other types of inputs are also possible and deemed to be within the scope of the inventive concepts, systems and techniques described herein). Thus, in FIGS. 5 and 5A, the horizontal axis represents positive and negative voltage values. Accordingly, to the left of zero (0) volts (indicated by reference numeral 71 in FIG. 5) are negative voltage values and to the right of 0 volts 71 are positive voltage values).

As shown in FIG. 5, when the input voltage to the system is at or near zero volts 71, the system is at rest (that is, the system has zero response). It should be appreciated that the same result is achieved (i.e. the system is at rest) if the input voltage to the system is selected having a value anywhere in the region designated by reference numeral 72.

When the input voltage to the system is sufficiently high (designated as "+B" volts in FIGS. 5 and 5A and identified with reference numeral 73), the system provides a maximum response (or maximum output) as indicated by the dashed line designated by reference numeral 75 in FIGS. 5 and 5A. It should be appreciated that the system provides a maximum response whenever the input is at +B volts or greater. That is, any value greater than +B volts can be used as a first output from a PM controller. Thus, the first value provided by the PM controller can be selected as +B volts or as any voltage greater than +B volts (e.g. any value from the region designated 76 may be used).

When the input voltage to the system is at a sufficiently low input (designated as "−B" volts input in FIGS. 5 and 5A and identified with reference numeral 78), the system provides a minimum response (or minimum output) as identified by the dashed line designated by reference numeral 80. It should be appreciated that the system provides a minimum response whenever the input is at −B volts or less. That is, any value less than −B volts can be used as the second output from a PM controller. Thus, the second value provided by the PM controller can be selected as −B volts or as any voltage less than −B volts (e.g. any value from the region designated 82 may be used).

In the regions designated 86, 88 (i.e. the regions between ±A volts and ±B volts, respectively and denoted by cross-hatching in FIGS. 5 and 5A), one is uncertain of the system response in these regions due to non-repeatable, non-linear behavior of the system in response to system input values in the regions 86, 88. Such non-repeatable, non-linear behavior may be caused by one of a plurality of different factors or characteristics such as static friction, for example. One example of a system having regions of non-repeatable, non-linear behavior is the system described above in conjunction with FIG. 1B.

Accordingly, in systems having regions of non-repeatable behavior, in accordance with the techniques of the present invention described herein, a first output from the PM controller can correspond to any value above a voltage value of +B volts (e.g. the first output from the PM controller can have any value in the region 76 which includes +B volts). As long as there some degree of certainty that the system response corresponding to that input value is known, and that the input value is high enough to surpass the region of uncertainty (i.e. region 86), that input value to the system would suffice for use as the first output of the PM controller.

Similar logic is true for the second and third output values of the PM controller, other than that they may take values from different regions (i.e. regions 72 and 78, respectively). Hence, it is possible to have the luxury of choosing specific values for each of the first, second or third outputs of the PM controller from a wide range of values.

Thus, as illustrated in FIG. 5, it is possible to select a single value, from a range of possible controller values (e.g. range 76), which produces the maximum possible system output and set that input value as the first controller output value. Similarly, it is possible to select a single value, from a range of possible controller values (e.g. range 82), which produces the minimum possible system output and set that input value as the second controller output value and similarly, it is possible to select a single value, from a range of possible controller values (e.g. range 72), which produces the no output (i.e. zero output) from the system and set that input value as the third controller output value.

Referring now to FIG. 5A, a plot of system response vs. system input is shown with a PM controller used to provide input to the system. A value corresponding to a maximum possible output value from the PM controller is designated by reference numeral 90 and a value corresponding to a minimum possible output value from the PM controller is designated by reference numeral 92. Thus, it should be appreciated that while the entire input ranges designated 72, 76, 82 in FIG. 5 are available to drive the system, in the example shown in FIG. 5A, the available range to drive the system to a maximum possible system output is from the value designated by reference numeral 73 (i.e. +B volts) to value designated by reference numeral 90 (i.e. PM controller maximum possible output value). Similarly, the available range to drive the system to a minimum possible system output is from the value designated by reference numeral 78 (i.e. −B volts 78) to the value designated by reference numeral 92 (i.e. PM controller minimum possible output value 92).

Thus, in one embodiment, the maximum PM controller output value 90 is selected to be the first controller output value, the minimum PM controller output value 92 is selected to be the second controller value, and zero volts 71 is selected to be the third controller output value. With these selections of PM controller values, the PM controller will always work well with the system.

It should, however, be appreciated that even though the above statement is always true, one can still decide to choose less than the maximum or minimum controller values. For example, in some applications it may be desirable or even required to select a value corresponding to about 85% of the maximum controller output to be the first controller value; and/or select a value corresponding to about −80% of the minimum controller output to be the second controller value; and/or select a value corresponding to about 5% of the maximum (or minimum) controller output to be the third controller value.

Choosing the controller outputs in this manner, the PM controller will always work, provided that the first and second controller output values are selected to pass over regions 86, 88 (i.e. regions there the system response is ill-behaved due to non-linearities or highly variable system responses) and the third controller value does not place the system in regions 86, 88.

It should, however, be appreciated that from the system response point of view, and as illustrated in FIGS. 5 and 5A, selection of controller output values within an acceptable range of values would not make any difference in the performance of the PM controller scheme described herein.

Hence, in summary, it is possible to: choose a value which is 100% of the maximum possible controller value to be the first controller output value; choose a value which is 100% of the minimum possible controller value to be the second controller output value; and choose a value which is 0% of the maximum (or minimum) controller value to be the third controller output value and under these conditions, the PM controller will always work well.

However, even though the above statement is true, one can still decide to choose controller output values which are less than 100% of the maximum or minimum controller output values to be the first and second controller values. One possible reason to not use the full 100% would be when it is desirable to reduce possible vibrations and stresses which the input pulses may cause to a system. One possible reason to not use 0% would be when it is desirable to compensate for a constant external force, such as a gravitational force. These are, of course, only examples and there could also be other reasons to not use full 100% and 0% of the maximum or minimum controller output values to be the first and second controller values.

From the system response point of view, and as illustrated in FIGS. 5 and 5A, selection of such controller output values would not substantially change the performance of the PM controller scheme.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

The invention claimed is:

1. A method of controlling movement or position of an object coupled to one of a motor, an engine, a pump, and a control valve associated with a system, the method comprising a repetitive sequence of the following:
   (a) obtaining actual values corresponding to a position of the object, wherein obtaining the actual values comprises sampling values representing the object's actual position, wherein the object position is controllable by delivering control signals to the system;
   (b) receiving a sequence of command position values;
   (c) generating a sequence of impulse signals based upon comparing ones of the actual values to ones of the command position values, wherein comparing an actual value to a command position value includes:
      if the difference between the command position value and the actual value is greater than an upper bound of error, generating an impulse signal having a first magnitude value;
      if the difference between the command position value and the actual value is less than a lower bound of error, generating an impulse signal having a second magnitude value; and
      if the difference between the command position value and the actual value is neither greater than the upper bound of error nor less than the lower bound of error, generating an impulse signal having a third magnitude value;

(d) applying the sequence of impulse values signals to the system to accurately control the position of the object while overcoming nonlinear static friction, Wherein the first, second, and third magnitude values are different from one another and do not change during successive iterations of the repetitive sequence, wherein the first magnitude value is large enough to overcome nonlinear forces opposing object movement in the first direction and the second magnitude value is large enough to overcome nonlinear forces opposing object movement in the second direction, wherein the third magnitude value is smaller than a value which would invoke a nonlinearity in the system.

2. The method of claim 1, wherein:

the first magnitude value corresponds to a first non-zero value that forces the object toward the command position value in a first direction; the second magnitude value corresponds to a second, different non-zero value that forces the object toward the command position value in a second direction that is different from the first direction; and the third magnitude value corresponds to a value that does not force the object toward the command position value.

3. The method of claim 2, wherein:

the third magnitude value is zero.

4. The method of claim 1, wherein the first magnitude value is greater than a first range of control values that result in unrepeatable system behavior, the second magnitude value is less than a second range of control values that result in unrepeatable system behavior, the second range of control values being less than the first range of control values, and the third magnitude value is neither greater than the first range of control values nor less than the second range of control values.

5. The method of claim 1, wherein the first magnitude value is a maximum possible positive control value for the system and the second magnitude value is a maximum possible negative control value for the system.

6. The method of claim 1, wherein a time interval between successive iterations of the repetitive sequence is constant.

7. The method of claim PM, wherein the motor is a rotary electric motor.

8. The method of claim 1, wherein obtaining an actual value comprises measuring the actual value.

* * * * *

UNITED STATES PATENT AND TRADEMARK OFFICE
CERTIFICATE OF CORRECTION

PATENT NO.       : 9,488,974 B2                          Page 1 of 1
APPLICATION NO.  : 12/857827
DATED            : November 8, 2016
INVENTOR(S)      : Yun Seong Song et al.

It is certified that error appears in the above-identified patent and that said Letters Patent is hereby corrected as shown below:

In the Specification

Column 3, Line 22, delete "or not does not affect" and replace with --does not affect--.

Column 3, Lines 57-58, delete "fully on-fully off" and replace with --fully-on fully-off--.

Column 11, Line 4, delete "as there some" and replace with --as there is some--.

Column 12, Line 38, delete "submitted that that the" and replace with --submitted that the--.

In the Claims

Column 14, Line 20, delete "claim PM," and replace with --claim 1,--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*